United States Patent Office 3,597,429
Patented Aug. 3, 1971

3,597,429
DERIVATIVES OF TETRAZOLYL
ALKANOIC ACIDS
Shin Hayao, Elkhart, and Wallace Glenn Strycker, Goshen, Ind., assignors to Miles Laboratories, Inc., Elkhart, Ind.
No Drawing. Filed Feb. 15, 1968, Ser. No. 705,632
Int. Cl. C07d 55/56, 57/00
U.S. Cl. 260—268PH                        7 Claims

ABSTRACT OF THE DISCLOSURE

A series of derivatives of ω-(5-substituted-2-tetrazolyl) alkanoic acids that is useful as anti-inflammatory agents. These compounds are prepared by reacting a tetrazolyl acyl halide with a suitable amine or a tetrazole with an appropriate haloalkyl amide or ester.

This invention relates to a novel series of chemical compounds having beneficial properties. More particularly, this invention relates to a new series of derivatives of ω-(5-substituted-2-tetrazolyl)alkanoic acids having advantageous pharmacological properties.

The compounds of this invention may be represented by the structural formula:

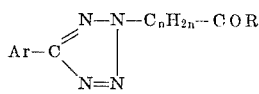

in which Ar is a member selected from the group consisting of phenyl or halo substituted phenyl, R is a member selected from the group consisting of

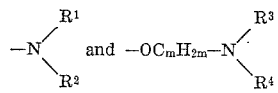

$R^1$ is a member selected from the group consisting of H, lower alkyl and

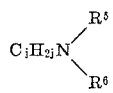

$R^2$ is a lower alkyl,

is a member selected from the group consisting of N(lower alkyl)$_2$,

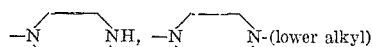

and

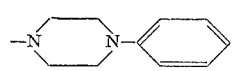

and $R^3$ is a member selected from the group consisting of H and lower alkyl, $R^4$ is a member selected from the group consisting of H and lower alkyl, and $n$, $m$ and $j$ are integers between about 1 and 4 which may be the same or different.

The compounds of this invention may be prepared in the form of an amide or in the form of an acid addition salt. Preferably, non-toxic pharmacologically acceptable acid additions salts are formed. These acid addition salts may be prepared from mineral acids such as halogen acids or sulfuric acid, or organic acids, such as citric acid, maleic acid, oxalic acid and other similar acids. Preparation of these acid addition salts will be described in subsequent detailed examples and will not, therefore, be set forth at this point.

The novel compounds of this invention may be readily prepared by amination of a tetrazolyl acyl halide. Advantageously this amination is carried out with a primary or secondary amine. Although the conditions of the reaction are not considered critical, the reaction is beneficially carried out in the presence of a suitable solvent, such as benzene, toluene or chloroform, and the reactants are heated to promote the formation of a final product. If the reaction is exothermic in nature, cooling apparatus is advantageously provided.

A satisfactory acyl halide is facilely provided by reacting a tetrazolyl alkanoic acid with a suitable reagent such as $SOCl_2$, $SOBr_2$, $POCl_3$ and $PCl_5$. Preferably, in forming the acyl halide the reactants are heated under reflux in the presence of a suitable solvent. Solvents such as benzene, toluene and chloroform may be advantageously used with this reaction.

An ω-(5-substituted-2-tetrazolyl)alkanoic acid may be prepared by base catalyzed alkylation of the corresponding 5-substituted tetrazole using as an alkylating agent a compound which will substitute the tetrazole at the 2-position with the desired carboxylic acid side chain or a precursor thereof. For example, an ω-halo ester can be used to produce the ester corresponding to the desired tetrazolyl alkanoic acid. The ester can then be hydrolyzed with acid or saponified with base and acidified to give the desired alkanoic acid. Another acid precursor which can be used is an ω-halonitrile, the use of which results in the formation of the nitrile corresponding to the desired alkanoic acid. Acid hydrolysis of the nitrile or basic hydrolysis followed by acidification results in production of the desired alkanoic acid. For synthesis of tetrazolyl-propionic acids, a particularly useful alkylating agent is β-propiolactone.

The new compounds of this invention may also be prepared by reacting a 5-substituted tetrazole with a haloalkyl amide or ester. The amide may be a primary or a secondary amide. In this reaction, the reactants are preferably heated under reflux in the presence of a suitable solvent such as anhydrous ethanol, 2-propanol and dimethylformamide.

The preparation of these compounds may be illustrated by the following series of equations, in which the first equation uses a tetrazolyl alkanoic acid as starting material:

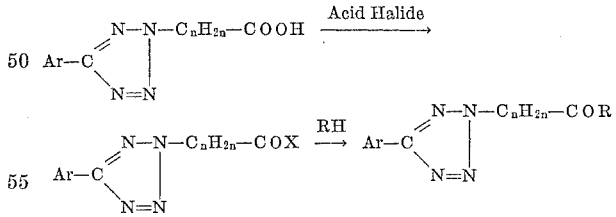

In the situation where an aryl tetrazole is reacted directly with a haloalkyl amide or ester the preparation may be illustrated as follows:

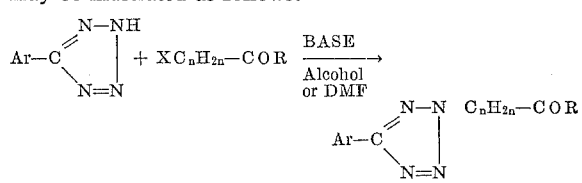

In the above equations X is a halogen.

The compounds of this invention have beneficial pharmacological properties. More particularly, these compounds, in therapeutically effective amounts, induce anti-inflammatory activity.

Suitable medications may be prepared by combining one or more of the compounds of this invention as an active ingredient with fillers, carriers, extenders and excipients generally used in pharmaceutical formulations. The active ingredient may be in the form of the amide or ester and is preferably in the form of the pharmacologically acceptable non-toxic salt thereof. Medications may be prepared in solid or liquid states as tablets, capsules, suspensions and similar dosage forms suitable for oral, intraperitoneal and other convenient means of administration. The active ingredient may be mixed with common diluents or tableting adjuncts such as cellulose powder, corn starch, lactose, talc and such, according to accepted manufacturing practices. Unit dosages (mg.) of active ingredient in the medication may be varied so that the amount used is adequate to provide the desired therapeutic results without untoward side effects and permits satisfactory variations in dosages administered. These medications are preferably prepared according to accepted pharmaceutical practices.

Anti-inflammatory activity was observed when medications including compounds of this invention as an active ingredient were administered orally to randomly selected groups of rats weighing between 260 and 400 gms. The active ingredients were evaluated according to a procedure in which pleural effusion was elicited by intrapleural administration of Evans Blue and Carrageenin (5 ml. of solution of 0.075% Evans Blue-0.025% Carrageenin). The anti-inflammatory medication was given orally one hour before the intrapleural administration of the solution. At 6 hours the animals were sacrificed and the exudate measured.

Groups of 7 animals were used for each evaluation. With a uniform oral dose of 127.6 mg./kg. of active ingredient a reduction of between about 15% and 24.2% was observed in the volume of pleural exudate.

This invention will be further understood by reference to the following examples which describe specific compounds of the invention and processes for the preparation thereof. These examples are intended to be representative of the invention and not to limt the scope of the same which is properly set forth in the appended claims.

EXAMPLE 1

N,N-diethyl-2-(5-phenyl-2-tetrazolyl)acetamide 5-phenyl-2-tetrazolylacetyl chloride (22.3 g., 0.1 mole) was added in small portions to a solution in an ice bath of diethylamine (14.6 g., 0.2 mole) in 200 ml. of benzene. The mixture was stirred while in the ice bath for 2 hours and at room temperature overnight. The solvent was removed in vacuo and the concentrate dissolved in chloroform, washed with water and concentrated in vacuo. The concentrate was crystallized from an aqueous-methanol solution and twice treated with charcoal and recrystallized from an aqueous-ethanol solution, M.P. 98° C.–99° C., yield 12.3 g.

Analysis.—Calcd. for $C_{13}H_{17}N_5O$ (percent): C, 60.2; H, 6.56; N, 27.0. Found (percent): C, 60.1; H, 6.59; N, 27.2.

EXAMPLE 2

N-[3-(4-phenyl-1-piperazinyl)propyl]-2-(5-phenyl-2-tetrazolyl)acetamide 5-phenyl-2-tetrazolylacetyl chloride (22.3 g., 0.1 mole) was added in small portions to a stirred solution of 4-phenyl-1-(3-aminopropyl)-piperazine (21.9 g., 0.1 mole) and 200 ml. of benzene in an ice bath. A quantity of 20% sodium hydroxide (60 ml.) was added to the mixture and the mixture stirred while retained in the ice bath for 2 hours. The resulting solid was collected and twice recrystallized from an aqueous DMF solution, M.P. 136.5° C.–137.5° C., yield 13.5 g.

Analysis.—Calcd. for $C_{22}H_{27}N_7O$ (percent): N, 24.2. Found (percent): N, 24.6.

N-[3-(4-phenyl-1-piperazinyl)propyl]-2-(5-phenyl-2-tetrazolyl)acetamide maleate

N-[3-(4-phenyl-1-piperazinyl)propyl]-2-(5-phenyl-2-tetrazolyl)acetamide (13.5 g., 0.033 mole) and 10 g. of maleic acid were heated in methanol-water to form a solution. The solution was filtered and diluted with ether and cooled. A solid was collected and recrystallized from an aqueous-methanol solution, M.P. 186.5° C.–188.0° C. (dec.), yield 12.5 g.

Analysis.—Calcd. for $C_{22}H_{27}N_7O \cdot C_4H_4O_4$ (percent): C, 59.88; H, 5.95; N, 18.81. Found (percent): C, 59.86; H, 6.15; N, 18.95.

EXAMPLE 3

N,N-dimethyl-3-(5-phenyl-2-tetrazolyl)propionamide 3-(5-phenyl-2-tetrazolyl)propionyl chloride (42.0 g.) cf. Example 4, in 200 ml. of benzene was treated with gaseous dimethylamine to give dimethylamine hydrochloride which was filtered off. The filtrate was concentrated in vacuo to leave a dark syrup which was treated with sodium hydroxide solution. The resulting solid amide was collected on a filter, washed with water and dried at 50° C., yield 32.1 g. The dark alkaline filtrate was acidified with diluted hydrochloric acid to give a tan solid, yield 7.9 g., M.P. 108° C.–110° C. (small portion did not melt to 140° C.). This was crude 3-(5-phenyl-2-tetrazolyl)propionic acid. The crude amide was once recrystallized from aqueous methanol (treated with charcoal) to give a tan shiny solid of M.P. 52° C. to 64° C., yield 27.7 g. The amide was dissolved in benzene and chromatographed over a column of alumina ($1^2 \times 20$ inches) prepared in n-hexane. The column was eluted several times with benzene. The four fractions gave the same product (M.P. 65° C.–67° C.). They were combined and sublimed in vacuo (a wax bath temp. 150° C.–180° C.) using a vacuum pump (0.05 mm.) to give a pale yellow sublimate. The crude solid was recrystallized from benzene-n-hexane to give pale yellow needles of M.P. 67° C.–67.5° C., yield 15.2 g.

$\nu_{max.}^{CHCl_3}$: 1650 cm.$^{-1}$ (amide C=O)

Analysis.—Calcd. for $C_{12}H_{18}N_5O$ (percent): C, 58.8; H, 6.13; N, 28.6. Found (percent): C, 58.8; H, 6.03; N, 28.3.

The filtrate from recrystallization deposited a sticky, oily solid which solidified soon when scratched, yield 2.9 g., M.P. 60° C.–64° C. (impure product).

EXAMPLE 4

N,N-diethyl-3-[5-(3,4-dichlorophenyl)-2-tetrazolyl]propionamide 5-(3,4-dichlorophenyl)tetrazole (10 g., 0.046 mole) was added to a solution of sodium (1.07 g., 0.046 mole) in 150 ml. of anhydrous ethanol and the solution was heated under reflux for 30 minutes. N,N-diethyl-3-chloropropionamide (7.6 g., 0.046 mole) was added and the solution was heated under reflux with stirring for 48 hours. The mixture was filtered and the filtrate was concentrated in vacuo. The concentrate was triturated in water and the solid was collected and recrystallized from an aqueous-methanol solution. Yield 3.0 g., M.P. 85.5° C.–86.0° C.

Analysis.—Calcd. for $C_{14}H_{17}Cl_2N_5O$ (percent): C, 49.12; H, 5.00; N, 20.46. Found (percent): C, 49.24; H, 5.14; N, 20.48.

EXAMPLE 5

2-N,N-diethylaminoethyl 3-[5-(3,4-dichlorophenyl)-2-tetrazolyl]propionate hydrochloride A suspension of 3-[5-(3,4-dichlorophenyl)-2-tetrazolyl] propionic acid (14.3 g., 0.05 mole) in 100 ml. of thionyl chloride was heated under reflux for an hour. The excess thionyl chloride was removed in vacuo and benzene was added to the residue. The benzene solution was concentrated in vacuo to give an oil (—COCl; 1790 cm.$^{-1}$).
A benzene solution of 2-diethylaminoethanol (5.7 g., 0.049 mole) was added to a benzene solution of the acid chloride. The resulting mixture was warmed on a steam bath for half an hour and cooled. The solid that formed was collected and twice recrystallized from a methanol-ethyl acetate mixture, yield 8.7 g., M.P. 160.5° C.–161.5° C. (dec.).

*Analysis.*—Calcd. for $C_{16}H_{21}Cl_2N_5O_2 \cdot HCl$ (percent): C, 45.45; H, 5.24; N, 16.56. Found (percent): C, 45.49; H, 5.56; N, 16.34.

EXAMPLE 6

N-(2-N',N'-diethylaminoethyl)-3-[5-(3,4-dichlorophenyl)-2-tetrazolyl]propionamide hydrochloride 3-[5-(3,4 - dichlorophenyl)-2-tetrazolyl]propionic acid (9 g., 0.031 mole) and 60 ml. of thionyl chloride were heated under reflux for an hour. The solvent was removed in vacuo and the residue was freed from the solvent by evaporating with benzene in vacuo three times. The residue was dissolved in benzene and reacted with 3.6 g. of N-N-diethylethylenediamine (0.031 mole) by heating on a steam bath for 2 hours. The benzene solution was kept at room temperature and the solid that formed was collected and recrystallized twice from an acetone-ether mixture, yield 8.5 g., M.P. 107° C.–108° C. (dec.).

*Analysis.*—Calcd. for $C_{16}H_{22}Cl_2N_6O \cdot HCl$ (percent): C, 45.54; H, 5.50; N, 19.91. Found (percent): C, 45.46; H, 5.82; N, 19.65.

What is claimed is:

1. A compound selected from the group consisting of compounds of the formula:

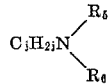

in which Ar is a member selected from the group consisting of phenyl and halo substituted phenyl, R is a member selected from the group consisting of

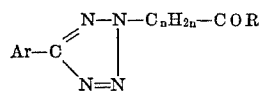

$R^1$ is a member selected from the group consisting of H, lower alkyl and

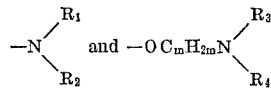

$R^2$ is lower alkyl,

is a member selected from the group consisting of N(lower alkyl)$_2$,

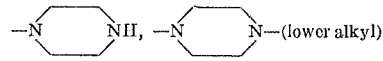

and

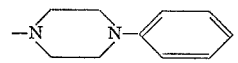

$R^3$ is a member selected from the group consisting of H and lower alkyl, $R^4$ is a member selected from the group consisting of H and lower alkyl and $n$, $m$, and $j$ are integers between 1 and 4 inclusive which may be the same or different and pharmacologically acceptable acid addition salts thereof.

2. A compound according to claim 1 which is N,N-diethyl-2-(5-phenyl-2-tetrazolyl)acetamide.

3. A compound according to claim 1 which is N-[3-(4-phenyl-1-piperazinyl)propyl]-2-(5 - phenyl-2-tetrazolyl)-acetamide.

4. A compound according to claim 1 which is N,N-dimethyl-3-(5-phenyl-2-tetrazolyl)propionamide.

5. A compound according to claim 1 which is N,N-diethyl-3-[5-(3,4 - dichlorophenyl)-2-tetrazolyl]propionamide.

6. A compound according to claim 1 which is 2-N,N-diethylaminoethyl 3 - [5-(3,4-dichlorophenyl) - 2 - tetrazolyl]propionate.

7. A compound according to claim 1 which is N-(2-N',N'-diethylaminoethyl)-3-[5-(3,4 - dichlorophenyl)-2-tetrazolyl]propionamide.

References Cited

UNITED STATES PATENTS 3,453,285   7/1969   Hayao _____ 260—308

OTHER REFERENCES

LaForge et al., J. Org. Chem., vol. 21, pp. 767–771 (1956).

Weygand, Organic Preparations (Interscience, New York, 1945), p. 161.

ALTON D. ROLLINS, Primary Examiner

U.S. Cl. X.R.

260—268H, 308D; 424—250, 269